G. M. HARTLEY.
DIFFERENTIAL GEAR.
APPLICATION FILED MAR. 18, 1911.
1,020,417.
Patented Mar. 19, 1912.
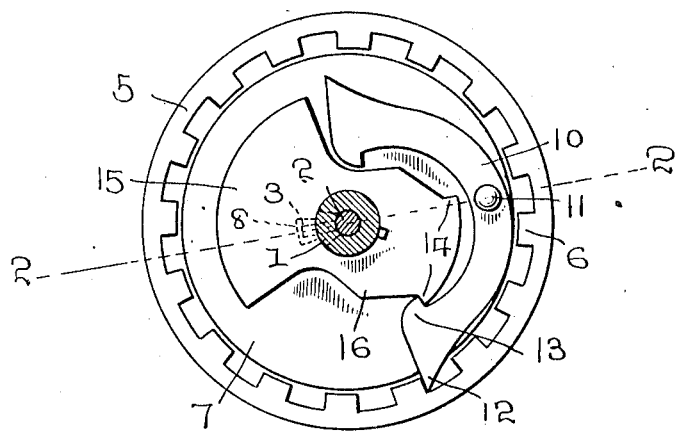
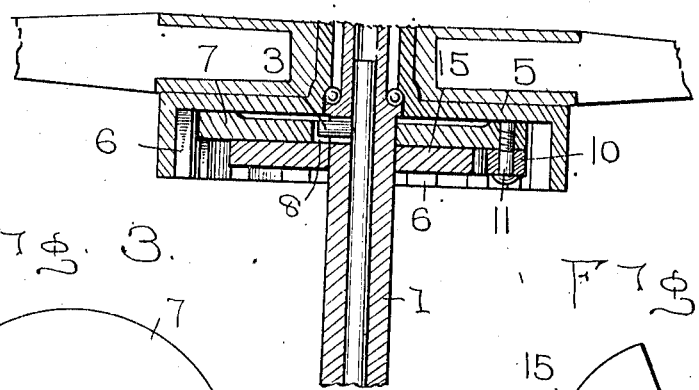
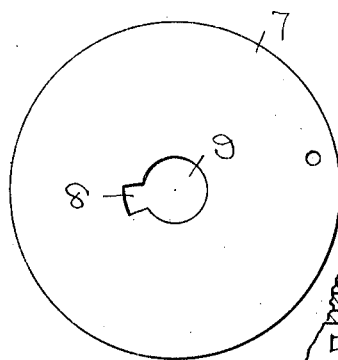
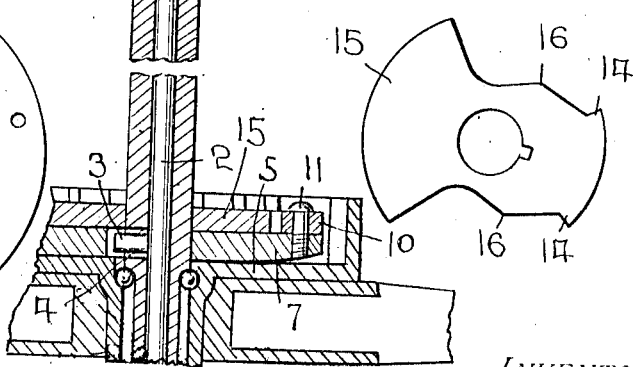
WITNESSES:
INVENTOR
G. M. Hartley
By
W. J. FitzGerald
Attorneys

UNITED STATES PATENT OFFICE.

GUY M. HARTLEY, OF DIGHTON, MICHIGAN.

DIFFERENTIAL GEAR.

1,020,417. Specification of Letters Patent. Patented Mar. 19, 1912.

Application filed March 18, 1911. Serial No. 615,287.

*To all whom it may concern:*

Be it known that I, GUY M. HARTLEY, a citizen of the United States, residing at Dighton, in the county of Osceola and State of Michigan, have invented certain new and useful Improvements in Differential Gears; and I do hereby declare the following to be a full, clear, and exact description of the invention, such as will enable others skilled in the art to which it appertains to make and use the same.

This invention relates to axles and more particularly to differential gearing for axles and wheels carried thereon.

An object of the invention is to construct an axle carrying differential gear mechanism upon opposite ends to control the wheels upon the ends of said axle.

Another object is to construct a differential gear of the above stated character which will eliminate the necessity of having stub shafts carrying only one wheel each and differential gear mechanism between the facing ends of said stub shafts.

Another object is to form a continuous shaft carrying a connecting rod with connecting pins positioned in the center thereof and extending from end to end, or wheel to wheel, thus forming a much stronger, more durable and more efficient shaft and differential gearing, and, a further object is to provide a shaft consisting of a small number of novelly formed parts which will be of simple construction and cheap to manufacture.

Other objects and advantages will be hereinafter set forth and pointed out in the specification.

In the accompanying drawings which are made a part of this application, Figure 1 is a vertical cross sectional view through the axle, looking toward one of the wheels provided with the differential. Fig. 2 is a longitudinal sectional view through the axle and one of the wheels provided with the differential, showing the connection between the shaft and the differential carried within the wheel. Fig. 3 is a detail view of one of the disks, and Fig. 4 is a detail view of one of the actuators.

Referring to the drawings in which similar reference numerals designate corresponding parts throughout the several views, 1 represents the hollow shaft within which is positioned the connecting rod 2 carrying the locking-pins 3, which extend through the openings 4 near the opposite ends of the shaft 1.

Secured upon the ends of the shaft 1 in the usual manner are the ordinary wheels or brake drums 5 attached to and forming parts of the rear wheels of a vehicle. Upon the interior of the flange of the wheels 5 are the cogs 6, which are preferably formed integral with said wheels. The exterior of the flange may still be used for a brake, as is the custom, the differential being positioned within the pocket formed by the flange of the wheel, which is shown as extending toward the opposite end of the wheel. Mounted upon the axle 1, adjacent the opposite ends thereof but inwardly of the wheels 5, are the disks 7, each disk having its surface toward the inner face of the adjacent wheel 5 concaved. Each disk 7 is provided with a notch 8 extending toward the edge and from the central opening 9, through which the axle projects. The pin 3 is adapted to be received within the notch 8, the purpose of which will be later described.

Pivotally secured to the disk 7 near the edge thereof is the double pawl 10, which is pivoted to the disk 7 at its center by the pivot-pin 11. The pawl 10 is secured to the side of the disk 7 away from the wheel 5. As will be noted the double pawl 10 is substantially semicircular in form having the pointed portion 12 to engage between the teeth 6 and the stop shoulders 13 to be engaged by the engaging shoulders 14 of the actuator 15, which is keyed to the shaft 1 and caused to rotate thereby.

As will be seen the actuator 15 is provided near the shoulders 14 with the knocking or releasing knees 16, which are adapted to knock against the ends of the double pawl 10 and disengage the latter from the teeth 6, at times. As will be noted the opening 4 within the shaft 1 is about twice the size of the opening 8 within the disk 7, the purpose of which will presently appear.

The operation is as follows: As the vehicle upon which the shaft 1 is secured travels and the axle is thereby caused to rotate, the pins 3, which extend through the slots 4 and into the notch 8, cause the disks 7 to rotate therewith carrying the double pawl 10 engaged with the teeth 6. The actuators 15 being rigid with the axle 1, each engage one of the stop shoulders 13, forcing the adjacent ends of the pawls 10 into engagement with the teeth 6 and holding them in such relation. Thus, it will be seen that when the machine or vehicle is moved in a straightforward direction the pawls 10 will be locked in engagement with the wheels 5. Should, however, the vehicle turn in either direction the action of the differential will be as follows: The wheel making the shortest turn would be held in locked position with the shaft 1 by means of the actuator 15 and pawl 10. The wheel making the longest turn, however, would be caused to rotate forward. The forward movement of the disk 7 and pawl 10 attached thereto, being limited by the pin 3. Then a short rotation of the wheel 5 in a backward direction causes it to engage again. The pins 3 move within the slots 8 until they engage the sides thereof. The slots or openings 4 within the axle 1 allow the pins to rotate a slight distance farther and carry the disks 7 with it and allow the actuator 15 and both the wheels to engage the opposite ends of the pawls 10 and drive the wheels in the opposite direction or hold them from running away when both of the wheels run faster than the axle, (as in going down hill). The wheels will ratchet ahead in this instance, the same as when driven in the opposite direction. The disks 7 being concave upon the back side tends to bring the friction toward the outer edge between it and the brake drum 5. This is done to make the disk move with the wheel except when prevented by the pin 3. As the pawl is in one piece, no springs are required to hold one end out of engagement with the teeth 6 while the other in engaged therewith. The knees upon the actuator 15 draw the pawls out of the cogs in the wheels 5 and hold them in a neutral position when required.

The object of the pin 3 working in notch 8 in the disk 7 is to stop the disk 7 carrying the pawl 10 from turning too far and locking the wheel 5 when it has occasion to turn faster than the opposite wheel. As will be noted the width of the notch 8 in disk 7 is only equal to one-half the distance the actuator travels to engage the other end of the pawls, and, therefore, the disk 7 can only turn one-half the distance from one extreme or end of pawl to the other, thereby leaving the wheels free to rotate ahead as much as necessary, but a small turn backward locks it in position again. It will also be seen that the strain is removed from the pivot 11 by means of the free end of the pawl or end opposite the one engaged with the cogs 6, resting against the actuator 15. The opposite end of the actuator 15 may, if desired, be finished the same as the pawl engaging end, and a double set of pawls used for each wheel.

It will thus be seen that I have provided a differential gear carried by the wheels on the opposite ends of a hollow shaft and connections between the said differentials which will be of novel form, effective in use and cheap to manufacture.

This invention may be applied to automobiles, carriages, traction engines or in fact any device which is mounted upon wheels and will be highly efficient in operation.

What I claim is:

1. A differential gear comprising a hollow axle, wheels and flange drums upon the opposite ends of said axle, a disk loosely mounted upon said axle at each end thereof and within said drums, a double pawl carried by each disk, an actuator carried by said axle adjacent each disk and adapted to actuate the double pawl pivotally carried by said disk, cogs carried by said drum adapted to be engaged by said pawls, said actuators being adapted to force said pawls in engagement with the cogs, a connecting rod carried within said hollow axle and extending from end to end, and means carried by said rod and projecting through said axle near the ends thereof and connecting the disks within the drums to control the rotation of the wheels upon said axle.

2. A differential gear comprising a hollow axle, wheels and flange drums upon the opposite ends of said axle, a concave disk loosely mounted upon said axle at each end thereof and within said drums, a pawl carried by each disk, an actuator carried by said axle adjacent each disk and adapted to actuate the pawl carried by the adjacent disk, cogs carried by said drums and adapted to be engaged by said pawls, said actuators being adapted to force said pawls in engagement with said cogs, a connecting rod carried within said hollow axle and extending from end to end, and pins carried by said rod and projecting through said axle near the ends thereof to connect the disks within the drums to control the rotation of the wheels upon said axle.

In testimony whereof I have signed my name to this specification in the presence of two subscribing witnesses.

GUY M. HARTLEY.

Witnesses:
WILLIAM J. BREEN,
CARROL HALE.